(12) United States Patent
Agrawal et al.

(10) Patent No.: US 6,995,891 B2
(45) Date of Patent: Feb. 7, 2006

(54) ELECTROCHROMIC SAFETY GLAZING

(75) Inventors: Anoop Agrawal, Tucson, AZ (US);
Yasser Elkadi, Tucson, AZ (US);
Torsten Holdmann, Woellstein (DE)

(73) Assignees: Schott North America Inc., NY (US);
Magna Donnelly Corporation, MI (US)

( * ) Notice: Subject to any disclaimer, the term of this patent is extended or adjusted under 35 U.S.C. 154(b) by 193 days.

(21) Appl. No.: 10/623,869

(22) Filed: Jul. 18, 2003

(65) Prior Publication Data

US 2005/0025980 A1 Feb. 3, 2005

Related U.S. Application Data

(62) Division of application No. 10/095,676, filed on Mar. 12, 2002, now Pat. No. 6,639,708.
(60) Provisional application No. 60/286,105, filed on Apr. 24, 2001.

(51) Int. Cl.
*G02F 1/15* (2006.01)
*G02F 1/153* (2006.01)
*C23C 14/00* (2006.01)

(52) U.S. Cl. .................. 359/265; 359/267; 359/270; 204/192.29
(58) Field of Classification Search ............... 359/265, 359/267, 266, 268, 269, 270, 273, 275; 204/192.29, 204/192.26
See application file for complete search history.

(56) References Cited

U.S. PATENT DOCUMENTS 5,244,557 A  *  9/1993  Defendini et al. ..... 204/192.29
6,222,604 B1 *  4/2001  Suginoya et al. ........... 349/158

* cited by examiner

*Primary Examiner*—Timothy Thompson
(74) *Attorney, Agent, or Firm*—Howard R. Popper

(57) ABSTRACT

An electrochromic device is achieved that exhibits the characteristics of impact-resistant safety glass by starting with a solid electrolyte sheet material and a peripheral sealant material sandwiched between substrates to heat and pressure such that the electrolyte bonds to the treated surfaces of the substrates with an adhesion of at least 1.8 kg/linear cm width causing the electrolyte to exhibit a tensile strength of at least 5 $kg/cm^2$.

7 Claims, 2 Drawing Sheets

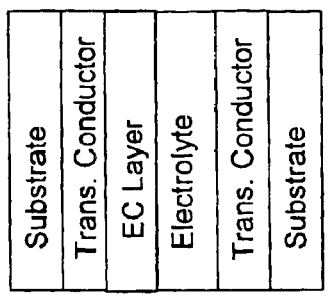
Fig. 1a
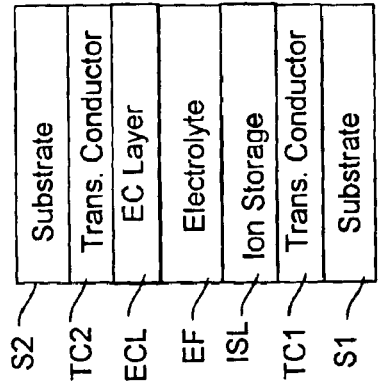
Fig. 1b
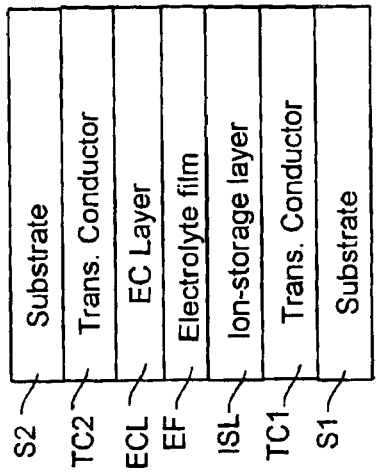
Fig. 1c
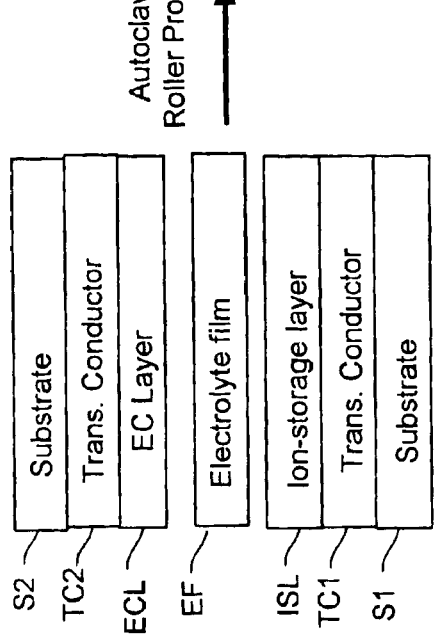
Fig. 2a
Fig. 2b

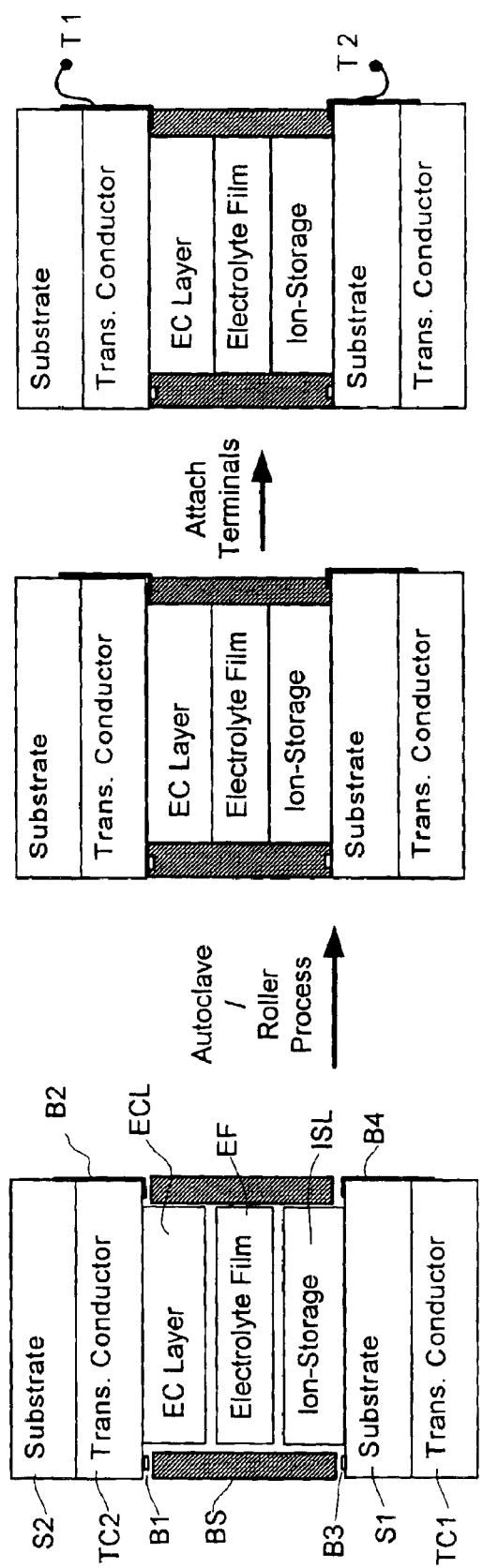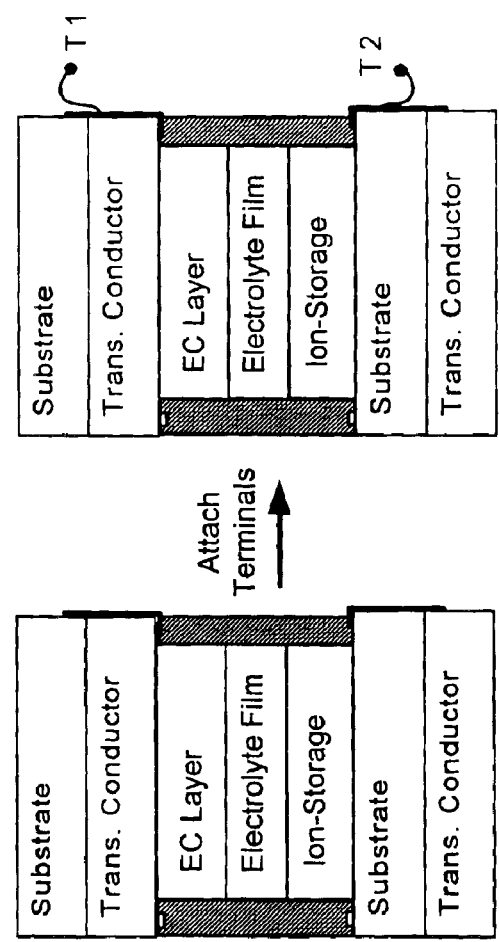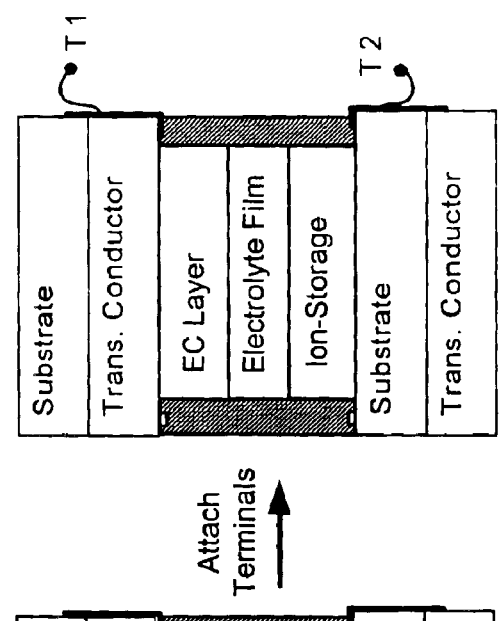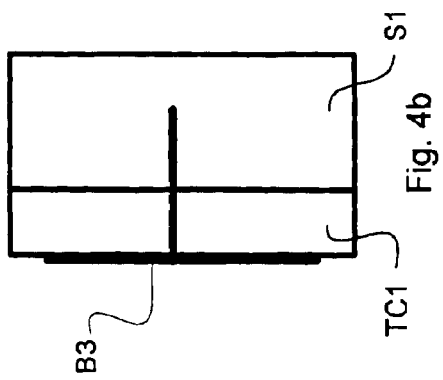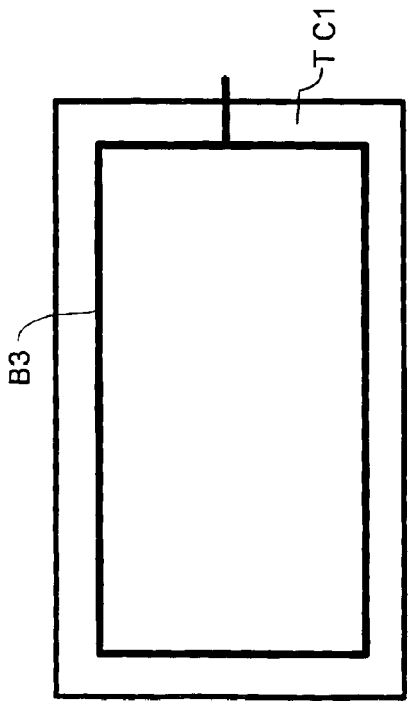

ELECTROCHROMIC SAFETY GLAZING

This application is a divisional of application Ser. No. 10/095,676, filed Mar. 12, 2002, now U.S. Pat. No. 6,639,708, which claims benefit of provisional application No. 60/286,105, filed Apr. 24, 2001.

FIELD OF THE INVENTION

This invention relates to electrochromic glazing and, more particularly, to such devices for safety glazing applications.

BACKGROUND OF THE INVENTION

Electrochromic (EC) devices have many applications, some of them are automotive mirrors, car glazing including sunroofs, glazing for other transportation means such as boats, planes, trains, buses, etc., and for architectural glazing applications for interior and exterior uses. Briefly, EC devices are made by sandwiching an electrolyte between two coated substrates. Many examples of such devices are shown in U.S. Pat. No. 6,317,248 which is incorporated herein by reference. To operate these devices, electrical power is applied across the electrolyte cross-section via the coatings on the substrate, so that a movement of the charged species (ions or polarized particles) takes place. These ions are transported via the electrolyte to the electrode surfaces for further reactions to take place which gives rise to color change or change in optical density. This change is varied reversibly at the discretion of the user.

As used herein, the terms electrochromic device are intended to also include devices in which polarized particles are not transported across the electrolyte for a color change, but instead simply re-orient themselves as in liquid crystal devices and suspended particle devices. In addition, other user-controlled variable transmission devices employing similar principles of construction, i.e., an active material sandwiched between the two substrates, such as "user controlled photochromic devices are also intended to be embraced by these terms. Such laminates may also be incorporated in window systems where additional glass elements are used (e.g., insulated glass units) where these additional elements may not be laminated.

While it is conventional practice in electrochromic devices to use a liquid electrolyte or a solid electrolyte, as shown, for example in U.S. Pat. Nos. 6,154,306 and 5,856,211, such prior approaches have not resulted in an electrochromic device that exhibits characteristics common to conventional (non-electrochromic) laminated glasses such as those made by laminating polymeric sheets Safelex™ (Solutia, Saint Louis, Mo.) or Butacite™ (Dupont, Wilmington, Del.). Safety, in the context of applicable building industry and automotive industry standards, is defined not simply as preventing leakage of the electrolyte from a broken laminate, but containment of the pieces of broken glass to avoid injury to the occupants in case of impact.

One might suppose that it would be straight-forward to produce an electrochromic device that could exhibit the attributes of safety glazing by interposing between the substrates a polymeric sheet for glass lamination such as those made of polyurethane, PVC or polyvinylbutyral, including Butacite™ from Dupont and Safelex™ from Solutia Springfield, Mass. However, an electrochromic device requires chemically active contact between the electrolyte and the coated surfaces of the substrates which would be prevented by such ordinary plastic sheets without modification. Modification, such as addition of plasticizers by soaking could compromise their ability to impart safety attributes. Accordingly, it would be advantageous to achieve an electrochromic device that would exhibit the characteristics of impact-resistant safety glass. Moreover, a mandated use of tempered glass would not be satisfactory as it limits the type of transparent conductors and other coatings that can be used with electrochromic devices. Assembled EC devices made of glass substrates may be laminated with external sheets of polymeric material, such as Spallshield™ (Dupont, Wilmington, Del.) to yield impact resistant laminates. However, these post processes cost and the scratch resistance of the polymeric sheets is usually not as good as glass.

SUMMARY OF THE INVENTION

In accordance with the principles of the present invention an electrochromic device is achieved that exhibits the characteristics of impact-resistant and scratch resistant safety glass without requiring the use of additional plastic laminates or tempered glass. We have discovered that such a device can be achieved by using a solid electrolyte sheet material, such as that described in EP 1056097, and by subjecting the assembly to heat and pressure in situ such that the electrolyte bonds to the treated surfaces of the glass substrate used for electrochromic devices with an adhesion of at least 1.8 kg/linear cm width, the electrolyte polymerizing to exhibit a tensile strength of at least 5 kg/cm$^2$.

Briefly, EP 1056097, incorporated here by reference, discloses a solid electrolytic polymeric binder selected from the group consisting of poly-acrylate, polystyrene, polyvinyl butyral, polyurethane, poly vinyl acetate, poly vinyl chloride and polycarbonate), a filler (such as polymer particles or pyrolitic silica, alumina, cerium oxide and zinc oxide), at least one dissociable salt (such as $LiClO_4$, $LiCF_3SO_3$, $LiN(CF_3SO_2)_2$, $NaCF_3SO_3$), at least one solvent for dissociating the salt (propylene carbonate, ethylene carbonate, gamma-butyro lactone, tetraglyme, sulfolane), and other additives (such as antioxidants and UV stabilizers).

To make the electrochromic safety glazing, the solid electrolytic sheet material is cut to size and placed between the two glass substrates having their coated surfaces (and for some types of EC devices, at least one of the surfaces is a reduced surface layer) facing the electrolytic sheet. The substrates are advantageously staggered in the busbar areas with the busbar on the two substrates along the two opposite edges, and the sheet preferably extends only to the coated area (i.e., does not extend on to the etched area or to the end of the substrate perimeter. The assembled device is then sealed in a vacuum bag (and a vacuum is pulled to degas). The assembled device is then subject to heating and pressure such as in an autoclave at 130° C. and 200 psi for 1 hr with 45 min ramp time to adhere the polymeric electrolyte to the substrates. The pressure is maintained after the completion of the heating cycle and after the samples have cooled down to 60° C. or lower.

BRIEF DESCRIPTION OF THE DRAWING

FIGS. 1a through 3 show different types of EC constructions;

FIGS. 2a and 2b show fabrication of an electrochromic device according to the invention which exhibits the characteristics of safety glass;

FIGS. 3a, 3b and 3c show fabrication of an alternative form of electrochromic device according to the invention; and FIGS. 4a and 4b show top and side views of a substrate with a transparent conductor and busbar deposited on the transparent conductor that may be used in the embodiments of FIGS. 2 and 3.

DETAILED DESCRIPTION

FIG. 1a shows the type of construction illustrated e.g., in U.S. Pat. No. 5,910,854, where all of the electrochromic activity takes place in an electrolyte that is positioned between transparent conductors. Such electrolytes may include liquid crystals or particles which align in the electric field imposed by electronic charging of the opposing electrodes. FIG. 1b shows a type of construction illustrated by WO 97/38350 in which the electrolyte is positioned between a transparent conductor and an electrochromic electrode layer. FIG. 1c shows yet another type of EC device, such as shown, e.g., in U.S. Pat. No. 6,266,177 B1, where the electrolytic layer is situated between an electrochromic layer and an ion-storage electrode, where the ion-storage layer may also exhibit electrochromic properties. If the devices of FIGS. 1a through 1c were to exhibit characteristics desired of safety glass, the electrolyte must bond to the transparent conductors without sacrificing its electrochromic abilities and must remain bonded thereto even after impact or fracture. In the type of construction illustrated in FIG. 1c, to exhibit the characteristics of safety glass, an electrolyte must be used which will bond to the electrochromic layer and to the ion storage layer of the substrates and remain bonded thereto even after impact fracture.

FIGS. 2a and 2b show the process of laminating the construction of FIG. 1c between substrates S1 and S2. A free standing electrolytic film sheet EF, having the appropriate characteristics mentioned above, is placed on the lower substrate LS1 which has deposited thereon a transparent coating TC1 and an ion storage layer ISL. Above the electrolytic film sheet EF the second substrate S2 is placed so that its electrochromic layer ECL faces film sheet EF. The second substrate S2 has its own transparent conductive coating layer TC2. The parts shown in FIG. 2a are placed between heated rollers (or in an autoclave) resulting in the adhesion of electrolytic film sheet EF both to the electrochromic layer ECL of the upper substrate S2 and to the ion storage layer ISL of the lower substrate S1. The assembly may have to be subjected to evacuation of trapped air before the simultaneous application of heat and pressure.

FIGS. 3a through 3c show the lamination of an EC device which has busbars B1, B2 and B3, B4 deposited on respective transparent conductive layers TC2 and TC1, advantageoulsy as a silver frit pattern such as disclosed in copending U.S. application Ser. No. 09/565,999. In FIG. 3a a bead sealant BS is applied about the periphery of electrolyte film sheet EF and the parts are placed between heated rollers (not shown) and laminated together to form the subassembly shown in FIG. 3b. Sealant BS can be an adhesive dispensed on one of the substrates, it could be a tape, or a "picture" frame form cut out of a sealant material. After processing, electrical leads T1, T2 are connected to the busbars by conductive adhesive, soldering or mechanical clamping.

FIGS. 4a and 4b show the layout of the busbars such as B3 on a transparent conductor layer TC1. a configuration of busbar on the transparent coating. The busbar can be a tape, a frame cut out of a sheet, or a frit (such as silver frit from Dupont Electronic Materials (Wilmington, Del.) thick film composition product number 7713 and Ferro (Santa Barbara, Calif.) silver paste FX 33-246), or a conductive adhesive, such as a silver filled epoxy.

In the aforementioned structures, the transparent conductors may be used which can be selected from the group consisting of lndium-tin oxide or fluorine doped tin oxide which may be deposited directly on the substrates, or they may be deposited on anti-iridescent or barrier coatings such as an SiO2 coating on soda-lime glass which may also reduce the sodium diffusion from the substrate into the device. The electrochromic layer may be either organic or inorganic. Some examples of inorganic electrochromic coatings are tungsten oxide, molybdenum oxide, mixed oxides comprising tungsten or molybdenum oxides, and examples of organic EC materials are polvaniline, polythiophene, and their derivatives, among which polyethylenedioxythiophene and its modifications should be noted. The ion-storage layers may be any of the following, iridium oxide, nickel oxide, manganese oxide and vanadium oxide, titanium-vanadium oxide and titanium-cerium oxide, niobium-vanadium oxide and mixtures comprising any of these oxides.

In FIG. 1a, the electrolyte will contact only the transparent conductor, whereas in FIG. 1c, the electrolyte will contact both the EC electrode and the ion-storage layer. Thus, an electrolyte with good adhesion for a device in FIG. 1a may not be suitable for the device in FIG. 1c from an adhesion standpoint because the substrates the electrolyte is in contact with are different. We have discovered an electrolyte and a process which will successfully bond when subjected to heat and pressure to each of the surfaces of the substrates of FIGS. 1a through 1c.

Adhesion is typically measured by a peel test (e.g., ASTM D3167). At 90 degree peel angle between the laminated substrate and the film which is being pulled, the adhesion should withstand a pulling force preferably greater 1.8 kg/linear-cm width. This is important in an impact test, because too low an adhesion can release glass pieces from the laminate which are bigger than 1 sq. inch (645 sq mm) and hurt the occupants. To improve the adhesion of the electrolyte film to the substrate coatings, one may add additives to the electrolyte or/and apply a adhesion promoting primer (e.g., silane based) to the electrode area, e.g., by a dipping or a vapor process.

In accordance with the invention, the electrolyte material disclosed in EP 1056097 is used as the electrolyte in any of the EC devices of FIGS. 1a through 1c by subjecting the device to heat and pressure in situ so as to cause the electrolyte to adhere to the respective layers or surfaces of the substrates with an adhesion of at least 1.8 kg/linear cm width and to exhibit a tensile strength to breakage of at least 5 kg/cm2 and an elongation to failure of 100%. Exemplary electrolytic materials of the above type have been produced by BASF (Ludwigschafen, Germany) with the nomenclature EK 10 and EK 64.

Electrolytes for strength are measured without laminating plates. If lamination process changes properties by increasing consolidation, reactions (including polymerization), the laminate can be formed using release layers so that the electrolyte can be test after lamination process. Peel is measured by laminating to only one rigid substrate. The other side has to be removed, thus it is preferred to use release layers on one side. A laminate such as complete EC device when formed is only tested for impact tests.

The aforementioned electrolyte consists of at least one polym ric binder (such as poly-acrylate, polystyrene, polyvinyl butyral, polyurethane, polyvinyl acetate, poly vinyl chloride and polycarbonate), a filler (such as polymer particles or pyrolitic silica, alumina, cerium oxide and zinc oxide), at least one dissociable salt (such as $LiClO_4$, $LiCF_3SO_3$, $LiN(CF_3SO_2)_2$, $NaCF_3SO_3$), at least one solvent for dissociating the salt (propylene carbonate, ethylene carbonate, gamma-butyro lactone, tetraglyme, sulfolane), and other additives (such as antioxidants and UV stabilizers). Compatible monomers of the polymers described above or others which further polymerize and/or crosslink may be added to enhance the strength of the electrolytic film or its adhesion to the substrates during the processing of the film itself and/or during the processing of the EC device. Adhesion promoters such as silanes or other ionic polymers may be added. Further, this mixture is made in a consistency so that it is extrudable into sheets. The fillers are either matched in refractive index to the polymer binder or their size is smaller than the wavelength of light so that the scattering of light (haze) is kept to a minimum.

The electrolytic film that is to be incorporated in the EC device is preferably extruded so that it may or may not have a uniform composition throughout its cross-section. For example, a film may be prepared by lamination or extruded with three separate regions, a core and a skin layer on either side. The two outer skins of the film (which itself may consist of more than one layer) may have different composition so that the adhesion to the substrates can be further enhanced, and/or these may provide better processability, and/or may impart better UV blocking properties. Typically these skins will have good adhesion to the core and will typically comprise less than 20% of the total cross-sectional thickness. The composition of the skin and the core could generally be the same as described above, or only one of them may have this composition. This is particularly suitable for devices which may have the liquid crystal material or suspended particles only in the core region In the EC devices of this invention, all thin coatings such as the transparent conductors, electrochromic layers and ion storage layers are predeposited on the substrates which are being laminated to the electrolytes. There may be other layers which may be deposited on the substrates such as UV absorbing, dielectrics and protective coatings such as additional ion-conductive coatings. When a peel test is conducted between the electrolyte and the substrate, it is important that the failure does not occur in any of the other underlying interfaces or layers. Another important advantage of laminated glazing is the noise reduction which is transmitted from the outside to the interior cabin.

Since, the EC devices of this invention have mechanical characteristics comparable to laminated glass, these devices are also capable of reducing sound transmission. While human ears are sensitive in a range of a few Hz to about 20,000 Hz, for most road and wind noise an important frequency range is between 100 Hz to about 8000 Hz. The viscoelastic and shear properties of the electrolyte along with the structural properties of the laminate should dampen the vibrations in this range. Since the properties of the polymers are temperature dependent, these benefits should hold in the temperature range of use, which is application dependent. Making the laminate using the two glass sheets in different thickness reduces the noise further as the characteristic frequency of vibration of the two plates is then different.

For automotive applications desired thickness of EC laminates is preferably less than 7 mm, and more preferably less than 5 mm to keep the weight under control. However, for special applications such as armored cars different guidelines may apply. A desired reduction in noise in the range of above mentioned frequencies is 3 dB or more, and more desired noise reduction is greater than 5 dB. This reduction is compared to a monolith sheet of substrate (e.g. glass) which is equivalent in thickness to the two substrates. For buildings, glass is rated as "sound Transmission Class" (STC) as measured by ASTM E90 test or equivalent. For example STC of a laminate formed by two ⅛th thick inch glasses with a Saflex™ layer of 0.03 inch increased the value to 35 from 31 for a ¼ inch thick glass. Since, the EC windows of this invention can provide more benefits to the user other than the control of light it is easier to justify their cost premium. The windows of this invention may further be used in complete window constructions such as integrated glass units.

In making electrochromic glazing there are a number of important factors that should be considered in addition to the adhesion and tensile strength of the electrolyte. Among these are the following, not necessarily in order of importance: Ionic conductivity or particle mobility (electrical property); optical properties; UV stability; temperature stability; processability; and ionic conductivity:

The charged species (or ions, e.g., H+, Li+, Na+ and others depending on the device type) are transported through the electrolytes thus, in order for these devices to function, the electrolytes should have a desired ionic conductivity. A preferred conductivity range at room temperature (25° C.) is $10^{-6}$ S/cm or greater. Since in some cases the use temperature extreme may be between −40° C. to 105° C., it is desired that in most of this temperature range i.e., above 0° C. their conductivity does not drop below $10^{-8}$ S/cm, more preferably below $10^{-7}$ S/cm. For example, an electrolyte with a conductivity of less than $10^{-8}$ S/cm at or below 0° C. may result in a device with slow kinetics, and may not be acceptable for an application where this needs to operate at low temperatures. Typically, the conductivity of the electrolyte decreases as the temperature is lowered. For field devices a measure of particle mobility is made by impedance measurements in a range of frequencies rather than ionic conductivity.

Optical properties:

The optical properties that are important for such application include optical transmission and haze. The electrolyte film may appear hazy due to a surface texture, but the quality of haze should be tested after making a laminate with dear glass substrates. The exceptions could be liquid crystal devices where a $2^{nd}$ component of a different refractive index is added to the electrolyte, and the electronic activation of the device switches between clear and opaque states. The haze for most devices should be as low as possible and the optical (photopic) transmission as high as possible. Typically when such films are laminated between two substrates, their optical haze (photopic) should be lower than 5%, and more preferably less than 2%. The intrinsic haze in the film can be measured by laminating a film of the electrolyte between two haze free substrates such as clear float line glass or clear glass with transparent coatings on it (haze free substrate have a haze value of lower than 0.2%). Haze of the laminate is then measured using ASTM test method D1003 by using a spectrometer such as Ultrascan XE made by Hunterlab (Reston, Va.). The electrolyte may have other additives to reduce the near-infra-red radiation transmission (typically between 700 to 2500 nm) or to add a tint to obtain a desired color.

These haze numbers and the optical properties should be maintained in the temperature range of intended use. The optical properties of the EC device will depend on several factors in addition to the electrolyte properties, some of these are substrate and electrode colors and the change in the electrode or electrolyte color due to the electrochromic action. Further, substrates can be polymeric or glass. The glass windows could be bent, toughened, tempered, and may have busbar patterns to address individual sections. All of these topics are discussed in detail in PCT patent application WO 01/84230 which is incorporated herein by reference. The electrochromic panels formed by using these electrolytes could have a wide range of color and modulation. Typically, the EC windows of interest will have a photopic contrast or contrast at 550 nm (bleach state transmission/ colored state transmission) in excess of 2:1 and more preferably in excess of 3:1 and most preferably greater than 5:1.

The degradation of the optical properties of the EC function, i.e., clear state transmission, bleached state transmission and the speed of change from one state to the other should be within 20% and more preferably within 10% before and after tests such as Temperature and UV tests described below. In addition, the color shift in any of the states should be minimum, so that it is not easily apparent to a user to distinguish a tested panel from the one that is not tested by means of color differences.

UV Stability:

The electrolytes for chromogenic devices will likely be used in applications where they are subjected to the UV radiation, either from the Sun or other light sources. In addition it is preferable that the electrolyte itself be resistant to UV in the range of 290 to 400 nm, and also be stable to visible light exposure. Further, it is preferable that the electrolyte absorb UV so that chromogenic windows largely filter out this radiation. One test to check the UV resistance is via a continuous UV exposure using a weatherometer. This test is described in the test-procedure SAE J1960 (SAE is Society of Automotive Engineers, Warrandale, Pa.), where it is conducted at a black panel temperature of 70 C. To accelerate the test further, one could increase the UV intensity and/or increase the black panel temperature. We have typically used either the SAE test or to a higher black panel temperature of 85 C. To measure the UV stability in the laminate configuration described above, the SAE J1960 protocol may be used together with subjecting the sample directly to the required UV intensity under dry conditions to give an exposure of 2500 kJ of UV as measured with a 340 nm band-pass filter. After this exposure, the properties (optical, mechanical and electrical) should still be within the specs listed in the other sections.

Temperature Stability:

The electrolyte must maintain its properties within the temperature range of use. Further, once the electrolyte is laminated into a chromogenic system, it may be subjected to temperatures higher than the use temperatures during further processing, such as edge sealing, encapsulation, integration with other components, etc. Thus, it is desirable that such electrolytes be chemically stable about 15° C. or more above their maximum use temperature, more preferably, 50° C. or more above their maximum use temperature, for at least 2 hours and preferably for more than 24 hours. Other temperature tests may be designed where glazing may be subjected to prolonged periods of elevated temperature, low temperature and cycled between the temperature extremes.

Processability:

Processability is an important aspect in handling the electrolyte film to be employed in an EC device. It is of course desirable to keep the electrolytic film away from contacting moisture and oxygen (air) and, to this end, it may be desirable that the film when extruded be simultaneously packaged with protective release films on both side. Extrusion along with compounding (mixing) is a standard plastic sheeting manufacturing method, and more information can be found in Plastics Materials and Processing, by A. Brent Strong, Prentice Hall, Upper Saddle River, N.J., 1999. In those cas s where the components are to be mixed well, a twin-screw extruder is used. Appropriate protective films to provide a barrier against moisture, oxygen and migration of electrolytic constituents from migrating to the outside include polyolefin (polyethylene, polypropylene, copolymers) and polyester such as polyethylene terephthalate, etc. Further, it is preferred that after the protective films are in place the resulting composite is passed through embossing calendars or similar equipment which may result in a surface texture similar to the Safelex™ and the Butacite™ lamination films. This ensures that during lamination gas bubbles at the interface can be extracted easily during the lamination process. To have better barrier the protected films may be rolled or cut to sized and packaged in metallized or other bags or cans for transportation. In the EC assembly operation, the bags containing the electrolyte are preferably to be opened under dry conditions where the sheets are cut to size although they may be briefly handled in air or an inert atmosphere when the protective covers are peeled off. As is well known, a seal is used at the edges of the substrate. The substrate (device) edges may be sealed after the assembly is subjected to heat and pressure to bond the electrolyte to the substrates (the lamination process). Alternatively, the electrolyte film may be placed on one of the substrates along with a bead of the seal around the periphery of the EC device. During the lamination process, the seal also cures, and a complete EC assembly is obtained in one process. In any of these a secondary seal may be applied to give better hermetic properties to the seal.

and opaque states. The haze for most devices should be as low as possible and the optical (photopic) transmission as high as possible. Typically when such films are laminated between two substrates, their visible optical haze should be lower than 5%, and more preferably less than 2%. The intrinsic haze in the film can be measured by laminating a film of the electrolyte between two haze free substrates such as clear float line glass or clear glass with transparent coatings on it (haze free substrate are defined as substrates having a haze value lower than 0.2%). Haze of the laminate is then measured using ASTM test method D1003 by using a spectrometer such as Ultrascan XE made by Hunterlab (Reston, Va.).

The electrolyte may have other additives to reduce the near-infra-red radiation transmission (typically between 700 to 2500 nm) or to add a tint to obtain a desired color.

These haze numbers and the optical properties should be maintained in the temperature range of intended use. The optical properties of the EC device will depend on several factors in addition to the electrolyte properties, some of these are substrate and electrode colors and the change in the electrode or electrolyte color due to the electrochromic action. Further, substrates can be polymeric or glass. The glass windows could be bent, toughened, tempered, and may have busbar patterns to address individual sections. All of these topics are discussed in detail in PCT patent application WO 01/84230 which is incorporated herein by reference. The electrochromic panels formed by using these electrolytes could have a wide range of color and modulation. Typically, the EC windows of interest will have a photopic contrast or contrast at 550 nm (bleach state transmission/ colored state transmission) in excess of 2:1 and more preferably in excess of 3:1 and most preferably greater than 5:1.

The degradation of the optical properties of the EC function, i.e., clear state transmission, bleached state transmission and the speed of change from one state to the other should be within 20% and more preferably within 10% before and after tests such as Temperature and UV tests described below. In addition, the color shift in any of the states should be minimum, so that it is not easily apparent to a user to distinguish a tested panel from the one not tested by means of color differences.

UV stability:

The electrolytes for chromogenic devices will likely be used in applications where they are subjected to the UV radiation, either from the sun or other light sources. In addition, it is preferable that the electrolyte itself be resistant to UV in the range of 290 to 400 nm, and also be stable to visible light exposure. Further, it is preferable that the electrolyte absorb UV so that chromogenic windows largely filter out this radiation before it reaches the occupant. One test to check the UV resistance is via a continuous UV exposure using a weatherometer. This test is described in the test-procedure SAE J1960 (SAE is Society of Automotive Engineers, Warrandale, Pa.), where black panel temperatur is 70 C. To accelerate the test further, one could increase the UV intensity and/or increase the black panel temperature. We have typically used either the SAE test or a higher black panel temperature of 85 C. To measure the UV stability in the laminate configuration described above, the SAE J 1960 protocol may be used together with subjecting the sample directly to the required UV intensity under dry conditions to give an exposure of 2500 kJ of UV as measured with a 340 nm band-pass filter. After this exposure, the properties (optical, mechanical and electrical) should still be within the specs listed in the other sections.

Temperature Stability:

The electrolyte must maintain its properties within the temperature range of use. Further, once the electrolyte is laminated into a chromogenic system, it may be subjected to temperatures higher than the use temperatures during further processing, such as edge sealing, encapsulation, integration with other components, etc. Thus, it is desirable that such electrolytes be chemically stable about 15° C. or more above their maximum use temperature, more preferably, 50° C. or more above their maximum use temperature, for at least 2 hours and preferably for more than 24 hours. Other temperature tests may be designed where glazing may be subjected to prolonged periods of elevated temperature, low temperature and cycled between the temperature extremes.

Humidity is also used in test procedures, however, it is more of a function of seal integrity. Some of these tests can be found in Agrawal A., Lampert C. L., Nagai J., "Durability Evaluation of Electrochromic Devices—An Industry Perspective" *Solar Energy Materials and Solar Cells*, 56 (1999) 449; Lynam N. R., Agrawal A., "Automotive Applications of Chromogenic Materials, in Large Area Chromogenics": *Materials and Devices for Transmittance Control*. Lampert C. M., Granqvist C. G., eds. SPIE, Optical Engineering Press, Bellingham, Wash. (1990) 46.). This means that after such exposure the optical, mechanical and electrical properties should still be within the specifications.

Processability:

Processability is an important aspect in handling the electrolyte film to be employed in an EC device. It is of course desirable to keep the electrolytic film away from contacting moisture and oxygen (air) and, to this end, it may be desirable that the film when extruded be simultaneously packaged with protective release films on both side. Extrusion along with compounding (mixing) is a standard plastic sheeting manufacturing method, and more information can be found in Plastics Materials and Processing, by A. Brent Strong, Prentice Hall, Upper Saddle River, N.J., 1999. In those cases where the components are to be mixed well, a twin-screw extruder is used. Appropriate protective films to provide a barrier against moisture, oxygen and migration of electrolytic constituents from migrating to the outside include polyolefin (polyethylene, polypropylene, copolymers) and polyester such as polyethylene terephthalate, etc.

Further, it is preferred that after the protective films are in place the resulting composite is passed through embossing calendars or similar equipment which may result in a surface texture similar to the Safelex™ and the Butacite™ lamination films. This ensures that during lamination gas bubbles at the electrode/electrolyte interface can be extracted easily during the lamination process. To have better barrier the protected films may be rolled or cut to sized and packaged in metallized or other bags or cans for transportation. In the EC assembly operation, the bags containing the electrolyte are preferably opened under dry conditions where the sheets are cut to size although they may be briefly handled in air or an inert atmosphere when the protective covers are peeled off. As is well known, a seal is used at the edges of the substrate. The substrate (device) edges may be sealed after the assembly is subjected to heat and pressure to bond the electrolyte to the substrates (the lamination process). Alternatively, the electrolyte film may be placed on one of the substrates along with a bead of the seal around the periphery of the EC device. During the lamination process, the seal also cures, and a complete EC assembly is obtained in one process. In any of these a secondary seal may be applied to give better hermetic properties to the seal.

One may also use a process where an edge seal is simultaneously co-extruded along with the electrolyte sheet. Since, extrusion is a continuous process, one will have to use one of the above described methods to cover the device edges which are perpendicular to the direction of extrusion. An additional step of UV radiation exposure may have to be introduced to further cure the sealant and/or the electrolyte.

EXAMPLE 1

An electrolyte was made according to the teaching of this application with the following composition in which as EK 10 and EK 64 are exemplary experimental materials produced by BASF following the teaching of EP 1056097.

| EK10 | 30% UV stabilized PMMA | 27.7% Tetraglyme | 5.3% $LiClO_4$ | 37% fumed $SiO_2$ |
|------|------------------------|------------------|----------------|-------------------|

The above electrolyte was laminated between two 2"×2" Tec 15 glass plate substrates (conductive side facing inwards) as described below:

1. Out of substrate stock, two 2"×2" squares of substrates are cut to size.
2. Two ⅛" wide bus bar strips are soldered to one end of each of the two substrates. Wire leads are soldered to bus bars.
3. A 2"×1¾" rectangular piece of solid polymer electrolyte EK10 is cut to size (electrolyte thickness=850 μm).
4. The SPE (Solid Polymer Electrolyte) was laid on the first substrate.
5. The substrates and the SPE are assembled with a ¼" offset with the bus bars on opposite sides.
6. The assembly is then vacuum sealed in a flexible bag and placed in an autoclave at 130 C at 200 psi for 1 hour (typical temperature range is between 100 to 180 C and the pressure range between 100 to 300 psi).

7. After the autoclave cycle is complete the device is left to stand for 24 hours prior to testing.

The impedance was measured by running a frequency scan (Solartron 1260 impedance analyzer, Farnborough, Hampshire, England) while measuring the real and imaginary components of the complex impedance at each frequency point. The frequency range was 1 Hz to 100 KHz. The impedance is then measured from the slope and intercept of the complex plane plot. Residual current was measured by subjecting the same device to a forward voltage scan at 10 mV/sec at 85 C and measuring the current at 1.5V.

| | | Conductivity, $\sigma$ | | |
|---|---|---|---|---|
| Electrolyte | Residual current A/cm$^2$ | $\sigma$ mS · cm$^{-1}$ (20° C.) | $\sigma$ mS · cm$^{-1}$ (0° C.) | $\sigma$ mS · cm$^{-1}$ (-20° C.) |
| EK10 | @1.5 V, 85° C. 1.36 × 10$^{-6}$ | 3.63 × 10$^{-5}$ | 1.44 × 10$^{-5}$ | 1.8 × 10$^{-6}$ |

Photopic transmission was measured using Hunterlabs Ultrascan XE colorimeter. A 2"×2" square of SPE is laminated between two transparent soda-lime glass plates (600$\mu$ thick film between two 2.1 mm thick substrates) as described above. The laminated assembly is then tested for color and transmission. The haze value with various electrolytes using these substrates was in the range of 1.6 to 2.4.

| Electrolyte | Color | Visible Transmission, % |
|---|---|---|
| EK10 | L = 90.06<br>a* = -1.98<br>b* = 3.45 | 76.4 |

EXAMPLE 2

Another clear electrolyte composition which was extruded is described below

| Electrolyte | $\sigma$ mS · cm$^{-1}$ (20° C.) | $\sigma$ mS · cm$^{-1}$ (0° C.) | $\sigma$ mS · cm$^{-1}$ (-20° C.) |
|---|---|---|---|
| EK63 | 3.6 × 10$^{-4}$ | 1. × 10$^{-4}$ | 2 × 10$^{-5}$ |

This consisted of 14% UV stabilized PVB, 14% UV stabilized PMMA, 33% tetraglyme, 4% LiClO4 and 35% SiO2 (all % by weight). The residual current for this film at 85 C at 1.5V was 1.3×10$^{-6}$ A/sq. cm. The elongation to failure of this film was 670% and its strength to break was 10 kg/cm$^2$. The film thickness was 600 micro-meters. This film when tested for adhesion on tungsten oxide according to ASTM D3167 yielded 30 pounds/linear inch width (5.4 kg/linear cm width). The film was supported by a backing film as the electrolyte film's adhesion exceeded the force that this film could bear before failure.

A laminate was produced with a 0.093 inch thick TEC15 glass coated with 350 nm thick tungsten oxide on the conductive side which was laminated to a 0.125 inch thick TEC8 piece of glass coated with 200 nm thick vanadium oxide on the conductive side. Asymmetry in glass thickness is desirable from a noise and vibration reduction perspective. The laminate samples which were about 1 sq. ft squares were tested for ANSI Z26.1-1996 (test 12) using a 0.5 pound ball drop. When the ball was dropped from 15 ft, the ball did not penetrate the laminate and no glass pieces bigger than 1 sq. inch were released from the laminate (FIG. 2). When the ball was dropped from 30 ft, it penetrated the laminate, but no pieces larger than 1 sq. inch were released from the laminate.

Procedure for Assembling an Electrochromic Device:

A TEC15 substrate (a glass substrate coated with conductive tin oxide) about 7.5 cm×7.5 cm was coated with a tungsten oxide doped with lithium oxide. The ratio of lithium to tungsten was 0.5. The method of deposition was by a wet chemical method (dip coating) as described in Allemand, et al U.S. Pat. No. 6,266,177 issued Jul. 24, 2001 entitled Electrochromic Devices. The coating thickness was 350 nm. The coating was etched from the non conductive side of the substrate and also along the perimeter, about 5 mm from the substrate edge on the conductive side. A wet chemical coating was also deposited on another TEC 15 substrate of crystalline vanadium oxide (200 nm thick) and similarly removed from the non-conductive side and around the perimeter as described above. A soldered metal busbar was applied on one of the edges of both substrates on the conductive side. The busbar was about 2 mm wide and located in the etched but conductive area. A wire was connected to the busbar on the substrate coated with tungsten oxide. The coated area of the substrate was immersed in 1.0 M LiClO$_4$ in PC. The bath had a stainless steel counterelectrode and also a Ag/AgNO$_3$ reference electrode. The tungsten oxide was galvanostatically reduced by lithium ions by applying a charge of 0.032 C/cm$^2$ of the coated area. The charge depends on the thickness of the two electrodes, their reversal capacities and their coloration efficiencies, since this charge is shuttled between the electrodes to color and bleach the EC device. Typically this charge should b greater than 0.005 C/cm$^2$ of the device. The reduction by incorporation of ions in a electrode is typically done by using one of H, Li, Na and K elements.

Once reduced, the tungsten electrode is rinsed with acetonitrile and blown dry with N$_2$ and stored under inert atmosphere. Although, vanadium oxide was not reduced in this process, but that could have been done instead or both electrodes could have been partially reduced. The same procedure applies for V$_2$O$_5$ or other electrochromic electrodes if they require reduction. The reduction could be done other than electrochemical means, such as chemical methods (exposing one or both electrodes to reducing liquids or gasses), photo-chemical or photo-electrochemical (here radiation, typically UV and/or visible light is used to catalyze or promote reduction), or even including reducing materials in the electrolyte sheet which reduce the electrode in-situ during post processing because of heat and/or by the use of radiation. Reducing agent may even be added to the coating solution so that reduction and coating are done in one step, more on this is described in U.S. Pat. No. 5,989,717 which is incorporated by reference herein.

The electrolyte sheet is cut to size, preferably in dry and most preferably in dry and inert atmosphere and placed between the two substrates where the coated (and for some types of EC devices, at least one of the surfaces is a reduced layer) face the electrolytic sheet. The substrates are staggered in the busbar areas with the busbar on the two substrates along the two opposite edges, and the sheet preferably extends only to the coated area (i.e., does not extend on to the etched area). The assembled device is then sealed in a vacuum double-bag (and a vacuum is pulled to degas) and placed in an autoclave at 130° C. and 200 psi for 1 hr with 45 min ramp time. The pressure is maintained after the completion of the heating cycle and after the samples have cooled down to 37° C. or lower. Devices are then taken out of the autoclave and removed from the vacuum bags carefully. It is important to verify that the adhesion between the electrodes and the electrolyte is maintained in both the reduced and the oxidized states. The edges of the substrate are sealed with an adhesive, which is either applied only on the edges or is forced between the two substrates (in the etched perimeter). To enhance adhesion, the etched areas could be primed with a suitable material (e.g., a silane based primer) which is compatible with the adhesive.

Alternatively, the seal is dispensed before the electrolyte is laminated, and then cured or processed along with the heat and/or pressure which is applied to process the laminate. An edge seal in tape form can be wrapped tightly around the perimeter (Thermedics BOC-9450, Woburn, Mass. or structural bonding tapes from 3M, Minneapolis, Minn., such as product number 9245) and taped in place using Kapton tape. The seal as applied is generally loose at the edges, and allows the degassing to take place, however, when it is heated in the autoclave under pressure this melts or softens, and bonds to the periphery. The seal may even be dispensed on one of the substrate before the assembly of the two substrates (e.g., a bead from crosslinkable silicones, polysulfides, polyurethanes and butyls such as Del Chem D2000 (from Delchem, Wilmington, Del.), which may have been treated with a adhesion promoting primer described above. The seal is later cured (e.g., crosslinks) in the autoclave or in the lamination process of choice. To allow degassing before lamination, a break in the seal could be left which can be sealed after lamination, or the sealant may flow in this area when heat/and or pressure are applied during lamination. A mechanical device such as a needle may be inserted in this seal for degassing, which is later removed when heat and/or pressure are later applied to complete the lamination process so that the hole left by the needle is sealed.

Alternatively, a seal in the form of a gasket laid to engulf the perimeter of solid electrolyte film with a minimal gap in between can provide an additional barrier to environmental transgress with less limitation on the seal width. For example, a square piece of electrolyte film was laminated between two transparent conductors. During the fabrication a square ¼" thick gasket of polyvinylbutyral (as seal) was cut to fit around the SPE then the assembly was fabricated and laminated as described above. After the lamination cycle was complete and the sample was allowed to cool, visual inspection of the fabricated device showed a seamless square transparency where the interface between the sealant and the electrolyte was hard to distinguish. Thus, in principle, one could select a material in a sheet form with the desired barrier properties and good adhesion to substrate, precut it (or stamp out the desired shape) to fit an EC construction and provide a visually appealing clean seal with or without additional edge seals. Some examples of such materials are ionic polymers such as Surlyn™ from Dupont (Wilmington, Del.), butyl tapes/sheets, B-staged epoxy resin tapes/sheets, etc. The sealants may also consist of moisture and oxygen scavengers.

A 3×3 inch EC device was constructed using the electrodes along with the polymeric film described above which is edge sealed by the Thermedics tape during the lamination process. The device transmission was 45% at 550 nm. When a coloring potential of 1.5V was applied to the device (with the tungsten oxide side negative), the device colored to a 15% transmission in 120 seconds. The device remained in this state for 4 days showing that it has good memory. When a bleach potential of −0.6V (tungsten oxide electrode positive). The device bleached to 45% transmission in 60 seconds.

The above description of the busbar is only given to make the sample given below, however, devices with silver frit busbars, stagger free arrangement of substrates and internal busbars can be used as described in U.S. patent application Ser. Nos. 09/565999 filed May 4, 2000 and in 60/091678 on Jul. 2, 1998.

What has been described is illustrative of the principles of the invention. Modifications may be made to further enhance adhesion and mechanical characteristics. For example, an extruded electrolyte sheet containing unreacted monomers may be used which are polymerized either during lamination or in post processing by heat or radiation. Further and other modification by those skilled in the art without, however, departing from the spirit and scope of the invention.

What is claimed is:

1. An electrochromic laminate comprising the steps of:
  a. placing a solid electrolyte sheet on a first substrate;
  b. placing sealing material around said perimeter of said solid electrolyte sheet;
  c. covering the sheet with a second substrate that extends over the sealing material; and
  d. subjecting both the electrolyte sheet and the sealing material to simultaneously applied heat and pressure to adhere said solid electrolyte sheet with said first and said second substrate.

2. An electrochromic laminate as in claim 1 which is impact resistant.

3. An electrochromic laminate as in 2 which reduces sound transmission at least 3 dB.

4. An electrochromic laminate as in claim 1 Wherein all of the electrochromic activities take place in said solid electrolyte sheet.

5. An electrochromic laminate as in claim 1 wherein said solid electrolyte sheet is situated between an electrochromic layer and a transparent conductor.

6. An electrochromic laminate as in claim 1 wherein said solid electrolyte sheet is situated between an electrochromic layer and an ion-storage electrode.

7. An electrochromic laminate as in claim 6 wherein said ion-storage layer may also exhibit electrochromic properties.

* * * * *